(12) United States Patent
Labuda

(10) Patent No.: US 7,803,412 B1
(45) Date of Patent: Sep. 28, 2010

(54) ENZYMATIC TREATMENT OF SPENT VANILLA BEANS

(75) Inventor: Ivica Labuda, Norwood, NJ (US)

(73) Assignee: BioKeys for Flavors, LLC, Norwood, NJ (US)

( * ) Notice: Subject to any disclaimer, the term of this patent is extended or adjusted under 35 U.S.C. 154(b) by 864 days.

(21) Appl. No.: 11/440,769

(22) Filed: May 25, 2006

Related U.S. Application Data

(60) Provisional application No. 60/684,829, filed on May 27, 2005.

(51) Int. Cl.
*A23L 1/23* (2006.01)
(52) U.S. Cl. .................... 426/44; 426/52; 426/425; 426/518; 426/534; 426/538; 426/629; 426/650
(58) Field of Classification Search .............. 426/44, 426/52, 425, 518, 534, 538, 629, 650
See application file for complete search history.

(56) References Cited

U.S. PATENT DOCUMENTS 5,705,205 A * 1/1998 Brunerie ................. 426/44

FOREIGN PATENT DOCUMENTS

WO WO 93/25088 * 12/1993

OTHER PUBLICATIONS

Li, T. et al. 2000. Biocatalytic synthesis of vanillin. Appl. Environ. Microbiol. 66(2) 684-687.*

* cited by examiner

*Primary Examiner*—Keith D Hendricks
*Assistant Examiner*—Hamid R Badr
(74) *Attorney, Agent, or Firm*—Law Firm of Walter D. Ames

(57) ABSTRACT

A process for obtaining flavor components from spent vanilla pods and beans, comprises forming a mixture of such spent pods and beans, incubating the mixture with an enzyme capable of destroying the cell membrane systems of said pods and beans for period of time and at a pH and temperature such that said cell membranes break down and release flavor constituents, and thereafter recovering the flavor constituents from the mixture.

14 Claims, No Drawings

ENZYMATIC TREATMENT OF SPENT VANILLA BEANS

This application is based on and claims the benefit of the filing date of provisional application Ser. No. 60/684,829, filed May 27, 2005 in the name of the present applicant, Ivica Labuda.

FIELD OF THE INVENTION

The present invention relates generally to treatment of spent products normally discarded or used for a low-cost purpose in order to rejuvenate the products and obtain high-cost materials therefrom. More specifically it relates a process for the production of natural flavor and modifier extracts obtained by the treatment of spent vanilla pods normally discarded or used for low-cost animal feed.

BACKGROUND OF THE INVENTION

Plants represent a rich pool of bioactive compounds. Vanilla is one of those plants; it is used for the production of natural vanilla flavor. Besides its obvious flavoring capacity, it can also be used as an anti-oxidant and microbial agent. Vanilla extract is obtained from cured vanilla pods by ethanol extraction. Vanilla extract contains about 60 to 80 different flavor components, of which vanillin is the major flavor component. In the past several decades a number of patents, e.g., U.S. Pat. Nos. 4,874,701, 4,981,795, 2,195,871, 5,017,388, 5,262,315 and 5,128,253, and Japanese Patent Nos. 2,195,871 and 5,227,980, relate to the formation of vanilla flavors. These patents suggest various approaches using renewable, cheap and natural raw material sources such as ferulic acid, vanillic acid, vanillyl alcohol, eugenol, etc., employing either microorganisms, tissue cultures or enzymes, for vanillin formation.

Enzymes are widely used as a class of biocatalytic reagents in a wide variety of reactions including, e.g., oxidations, reductions, hydrolyses, and carbon-carbon bond ligations. Based on the nature of the solvent used, the enzymes can perform either a hydrolytic or a synthetic catalysis. Biocatalysts are valued for their intrinsic abilities to bind organic substrates and to catalyze specific and selective reactions under the mildest of reaction conditions. These selectivities and specificities are realized because of interactions occurring between the enzyme active site and the substrate molecule. Biocatalytic reactions are particularly useful when a traditional chemical catalysis is difficult and expensive to complete. Enzymes differ in their specificity towards substrates; some are highly selective while others accept a wide variety of substrates.

Selective reduction of aromatic acids to their corresponding aldehydes by Actinomycetes sp. was reported by Jezo and Zemek (1986). Enzymes such as aryl-aldehyde oxidoreductase (carboxylic acid reductase EC 1.2.1.30) catalyze the formation of vanillin from vanillic acid (Rosazza et al., 1998, U.S. Pat. No. 5,795,759). Cellulases (endoglucanase, cellobiohydrolase, cellobiase, beta-glucosidase, etc.) on the other hand hydrolyze the β-covalent bond between glucose units in cellulose chains.

The development of the vanilla flavor during the curing treatment is partly due to the hydrolysis of a glucosylated precursor. An example of such glycoside is vanillin glucoside, which occurs in green vanilla pods (Arana. F. E., 1943, Food Research, vol. 8, pages 343-351). Precise biochemical pathways leading to all flavor components of vanilla are not known. Many flavor compounds are bound in plants and microorganisms, simply to protect the cells against the toxicity of these compounds. An enzyme breaking the glycosidic bond releases the flavor compound from its bond. An example of this phenomenon is an enzyme β-glucosidase, which hydrolyses the β-covalent bond of glucose from an aglycone. Two patents (U.S. Pat. No. 5,705,205 and FR-A-2,634,979) focused on the green vanilla beans and their curing process, during which the flavor develops. Flavor enhancement and efficiency of the curing process was central to these to patents.

At the industrial level, vanilla extract is obtained from vanilla pods that have been successfully cured. U.S. Pat. No. 5,705,205 (1998) suggests usage of (β-glucosidase to shorten the curing process of green vanilla beans. Another patent FR-A-2,634,979 (1990) describes a process during which the green pods are frozen at a temperature of between −5 and 30 degrees C. and then reheated before extracting the flavor constituents therefrom. This process makes it possible to shorten the curing time and avoids losses of the flavor compounds which can occur during the curing process due to microbial or enzymatic decomposition. The typical curing process does not allow for the addition of external enzymes, only enzymes naturally present in the vanilla beans are employed in the curing process. Once the vanilla beans are cured the flavor compounds are extracted with ethanol. The remaining vanilla beans after the extraction are called spent or exhausted vanilla beans. These beans are typically used for animal feed and in very small quantities as food additives to give a visual impression of vanilla flavor, e.g., in vanilla ice cream. It is generally believed that most of the flavor is extracted during the extraction process and that these spent vanilla beans contain very minute amounts of flavor compounds.

Based on the forgoing background, it is an important object of the present invention to provide a process during which additional flavor compounds and food modifiers are released or transformed from complexes in spent vanilla pods, thereby obtaining additional vanilla flavors and food modifiers from the spent pods.

SUMMARY OF THE INVENTION

My invention is directed to a process for preparing natural flavor compounds from spent vanilla beans or pods which, in a complete, commercial process, comprises the following steps. First the spent vanilla pods are ground. Then they are hydrated to form a ground, hydrated product having a liquid phase and a solid phase. The next process step is treating the ground, hydrated product with an enzymatic system that contains at least one enzyme capable of degrading the plant cells or transforming the flavor precursors and wherein said enzyme is selected from the group consisting of an enzyme having pectinase activity, an enzyme having cellulase activity, an enzyme having hemicellulase activity, an enzyme having oxidoreductase activity, an enzyme having lipase activity, an enzyme having protease activity, and mixtures thereof. After such enzyme treatment, the ground hydrated product containing said enzymatic system is incubated at general conditions of temperature of from about 10° C. to about 40° C. for a period of from about 2 hours to about 48 hours, said conditions being sufficient to enzymatically transform the flavor precursors and allow the release of natural flavor compounds in the hydrated product. The mixture of solid and liquid phases can be mixed with ethyl alcohol at a concentration of from about 1% to 50% product to enhance the release of natural flavor compounds. Thereafter the liquid phase is separated from the solid phase of the mixture, and the liquid phase that contains the natural flavor extracts together with other soluble materials is recovered. Within these extracts and materials further precursors to other flavors can be present. Some of these flavor compounds can modify taste perception.

DETAILED DESCRIPTION OF PREFERRED EMBODIMENTS

The present invention is directed toward a process utilizing enzymes to degrade and modify spent vanilla beans. Typically, there may be used one or more enzymatic systems chosen from hydrolases (E.C.3.) such as pectinase (polygalacturonase; EC 3.2.1.15), cellulases (1,4-[1,3;1,4]-β-D-glucan-4-glucano-hydrolase; EC 3.2.1.4), β-glucosidases, proteases (EC 3.4.23), hemicellulases (glycan hydrolase E.C. 3.2.1.), xylanase (1,4-β-D-xylanxylanohydrolase; EC 3.2.1.8), lipases (triacylglycerol lipase EC 3.1.1.3), esterases (E.C.3.1.), proteases (E.C.3.4.), oxidoreductases (EC 1.1.-EC 1.11), and transferases (E.C.2.). These enzymes may be used alone or in a mixture with β-glucosidase. These enzymes are well known to persons skilled in the art and many systems based thereon are commercially available. The broader implication of this discovery includes the economical production of products and intermediary by-products.

It is understood that the invention covers all the enzymatic systems, which make it possible to degrade and transform the precursors potentially contained in the spent (exhausted) vanilla pods. Persons skilled in the art will be able, using simple procedures such as those defined in the examples which follow, to choose the enzymatic systems that are appropriate. Preferably, the spent vanilla pods are treated with an enzymatic system which comprises: at least one enzyme capable of destroying the cell membrane systems of plant cells and is selected from the group consisting of an enzyme having hydrolase activity, such as pectinase activity, an enzyme having cellulase activity, an enzyme having hemicellulase activity, an enzyme having protease activity, an enzyme having lipase activity, and an enzyme having β-glucosidase activity, an enzyme having oxidoreductase activity or an enzyme having transferase activity. The enzyme is utilized in an amount of about 10 to about 1000 units per gram of spent vanilla pods.

It is further understood that the spent vanilla beans are ground and hydrated in water. Generally, without being an essential feature of the present invention, spent vanilla pods are present in the amount of between 5 to 50% of the water added. The enzymatic system advantageously comprises 10 to 1000 units of enzyme activity per gram of spent vanilla pods, and preferably from 20 to 500 units of enzymatic activity. It was observed that a range of between 40 and 400 units of enzymatic activity was even more advantageous for implementing the process according to the invention.

The enzymatic reaction is carried out at a pH which is advantageously between about 3 and 10, and preferably at the optimum pH for each individual enzyme system. As the pH of the ground, spent vanilla pods product obtained is approximately equal to 5, this ground product is therefore naturally at the optimal value for enzymes such as cellulases, pectinases, hemicellulases, and β-glucosidases. Enzyme systems containing lipases, proteases, esterases, oxidoreductases and transferases require a pH that is optimal for each enzyme system.

The process is carried out with stirring for a period of time sufficient to allow the degradation and modification of the spent vanilla pods and the release of the natural flavor components. Advantageously, this period will be greater than 2 hours at room temperature. This processing temperature can be increased or decreased while being careful not to exceed a maximum temperature which can result in degradation of the flavor precursors and enzymes. Decrease of the temperature too substantially can cause slowing or cessation of the desired reactions. The temperature will be generally between about 10 and 100 degrees C., preferably between about 30 and 40 degrees C.

Regarding the time that incubation takes place, the period of incubation will be between about 2 and 120 hours. However, it has been observed that the release is generally complete after a few hours of incubation, it being possible for persons skilled in the art to determine substantial completion by means of high performance liquid chromatography (HPLC) or gas chromatography mass spectroscopy (GCMS) analyses. After incubation, the liquid phase containing the vanilla flavor is separated from the solid phase, which contains especially insoluble cell residues. This separation may be carried out, for example, by filtration and/or by centrifugation.

The liquid phase containing the natural flavor compounds and food modifiers may then be used, either directly or after concentration of the compounds. Such concentration may be carried out by evaporation, selective chromatography, optionally under vacuum, and then filtration. It may also be carried out by extraction with solvents and subsequent evaporation of the latter. The following examples are intended to illustrate the invention without limiting it.

EXAMPLE 1

This example demonstrates the effect of different enzymes on the release of flavor components and their sensory attributes.

Ten grams (10 g) of dry, spent vanilla pods were ground and mixed with 90 g of deionized water. A slurry consisting of two phases, solid and liquid, was stirred. Different enzymes such as cellulase, xylanase, hemicellulase, pectinase, protease, lipases and oxidoreductase were typically added in the amount of 500-1,000 units per gram of dry spent vanilla pods. These enzymes were applied either alone or in combination with each other. One unit of cellulase liberates 1.0 µmol of reducing sugar measured as glucose from cellulose in one hour at a pH 5 at 37 degree C. One unit of xylanase liberates 1.0 µmol of reducing sugar measured as xylose equivalents from xylan per minute at pH a 4.5 at 30 degree C. One unit of hemicellulase liberates 1.0 µmol of D-galactose from hemicellulose per hour at a pH 5.5 at 37 degree C. One unit of pectinase liberates 1.0 µmol of galacturonic acid from polygalacturonic acid per minute at a pH 4.0 at 25 degree C. One unit of protease hydrolyzes hemoglobin to produce color equivalent to 1.0 µmol of tyrosine per minute at a pH 2.8 at 37 degree C. One unit of lipase hydrolyzes 1.0 microequivalent of fatty acid from a triglyceride in 1 hour at pH 7.7 at 37 degree C. Activity of laccase is expressed in nanokatal/ml; one nanokatal is the amount of enzyme needed to perform oxidative dimerization of one nanomole of 2,6-dimethoxyphenol (Slomczynski et al., 1995).

The incubation with the enzymes was typically carried out without pH adjustment at the natural pH of around 5.0. The pH was measured after addition of the enzyme and at the end of the enzymatic reaction and recorded. The slurry was mixed while mixture was incubated at 35 degree C., typically for 10 hours. At the end of the reaction, the mixture is filtered rapidly through a Whatman filter paper. A small portion (10 ml) of the filtrate was extracted with 5 ml of methylene chloride. The methylene chloride phase was concentrated and subjected to GC/MS analysis. The remaining filtrate was mixed with 96% alcohol to obtain a 50% aqueous-alcoholic medium. The filtrate was evaluated by sensory panel. The hydrolysis released a number of compounds from spent vanilla beans. Table 1 shows only the level of vanillin released and compares the sensory attributes of the samples.

TABLE 1

Effect of different enzymes on spent vanilla pods

| Enzyme | Vanillin (GC/MS area %) | Sensory Attributes |
| --- | --- | --- |
| 1. control | 0 | no aroma or taste |
| 2. cellulase | 30 | ice-cream-vanilla flavor, good mouthfeel |
| 3. pectinase | 10 | ice-cream-like, creamy, vanilla flavor |
| 4. hemicellulase | 20 | woody, creamy vanilla flavor |
| 5. lipase | 10 | weak vanilla, soapy, chemical flavor |
| 6. oxidoreductase laccase | 25 | cooked, creamy vanilla flavor |

EXAMPLE 2

This example illustrates the effect of β-glucosidase system on the release of flavor components.

Ten grams (10 g) of dry, spent vanilla pods were ground and mixed with 90 g of deionized water. A slurry consisting of two phases, solid and liquid, was formed and agitated. The enzyme, β-glucosidase, was added in the amount of 53 units of enzyme per gram of dry spent vanilla pods. One unit of enzyme activity is defined as the amount of enzyme which would liberate 1.0 μg of p-nitrophenol from p-nitrophenyl-glucoside at 35 degrees C. at pH 5. The incubation of spent vanilla pods with the enzyme β-glucosidase was carried out without pH adjustment at the natural pH of about 5.0. The pH was measured after addition of the enzyme and at the end of the enzymatic reaction and recorded. The slurry was mixed while incubated at 35 degree C. typically for 12 hours.

At the end of the reaction, the solid material was quickly filtered through a Whatman filter paper. A small portion (10 ml) of the filtrate was extracted with 5 ml of methylene chloride. The methylene chloride fraction was concentrated and subjected to GC/MS analysis. The remaining liquid filtrate was mixed with 96% alcohol to obtain a 50% aqueous-alcoholic flavor mixture. This filtrate was evaluated by a sensory panel. The hydrolysis released a number of compounds from the spent vanilla beans. Table 2 shows only the level of vanillin released and defines the sensory attributes of the sample.

TABLE 2

Release of flavor compounds from spent vanilla beans by β-glucosidase as detected by GC/MS.

| Enzyme | Vanillin (mg/l) | Sensory Attributes |
| --- | --- | --- |
| β-glucosidase | 155 | creamy, vanilla flavor, ice-cream-like, well rounded |
| Control | 11 | dirty, earthy, fermented |

EXAMPLE 3

This example demonstrates the impact and effect of the flavor and food modifiers prepared from spent vanilla pods in food systems.

Ten grams (10 g) of dry, spent vanilla pods were ground and mixed with 90 g of deionized water. A slurry consisting of two phases, solid and liquid, was stirred. Two enzymes, cellulase and β-glucosidase were added in the amount of 1,000 and 100 units per gram of dry spent vanilla pods, respectively.

The incubation with the enzymes was typically carried out without pH adjustment at the natural pH of around 5.0. The pH was measured after addition of the enzyme and at the end of the enzymatic reaction and recorded. The slurry was mixed while incubated at 35 degree C., typically for 10 hours. At the end of the reaction, the mixture was mixed with 96% ethyl alcohol to obtain 50% aqueous-alcohol solution. The mixture was mixed for 3 hours at room temperature and filtered through a Whatman filter paper. The filtrate was evaluated by a sensory panel.

TABLE 3

The impact and effect of the flavor and food modifier prepared from spent vanilla pods.

| Sample | Sensory attributes of skim milk |
| --- | --- |
| cellulase/β-glucosidase treated sample | creamy, well rounded, pleasant full-mouthfeel |
| Control (no enzyme) | watery, bitter, thin, cardboardy |

The essence of the present invention is a process for obtaining a natural flavor extract and a food modifier from the hydrated product of spent vanilla pods by treating the pods in an enzymatic system capable of degrading the plant cells and/or modifying precursors in spent vanilla beans. Ground, spent vanilla beans are used to facilitate the enzymatic catalysis of the cell components. Finer ground products will allow the enzymes to perform the reaction faster. Spent vanilla pods are understood to mean cured vanilla pods from which the vanilla components have already been extracted, typically with ethanol or carbon dioxide. An enzymatic system capable of disintegration and modification of the spent vanilla bean cells is understood to mean all the systems which can liquefy fruits, vegetables and, in general, all plant cells. It also means enzymes which can modify and transform existing chemical entities present in the spent vanilla.

It will be apparent to those of skill in this art that the foregoing examples are only illustrative of my invention and those modifications thereof and additions thereto will be apparent to those of skill in this art. As to all such modifications and additions, it is desired that they be included within the purview of my invention, which is to be limited only by the scope, including equivalents, of the following, appended claims

What is claimed is:

1. A process for recovering flavor constituents from vanilla beans and pods, comprising extracting vanilla flavors from said beans and pods by ethanol extraction to form spent vanilla materials as a byproduct, and thereafter treating said spent materials with an enzyme capable of degrading the plant cell systems of said spent materials for a period of time and at a pH and temperature such that said cell systems break down and release flavor constituents from said spent materials.

2. A process as claimed in claim 1, in which said enzyme is selected from the group consisting of a hydrolase, oxidoreductase and transferase and mixtures thereof.

3. A process as claimed in claim 2, in which said enzyme is a hydrolase.

4. A process as claimed in claim 2, in which said enzyme is an oxidoreductase.

5. A process as claimed in claim 2, in which said enzyme is a transferase.

6. A process as claimed in claim 3, in which said enzyme is selected from the group consisting of hydrolases with glucosidase, cellulase, pectinase, hemicellulase, xylanase, and lipase activity.

7. A process as claimed in claim 3, in which said enzyme is β-glucosidase.

8. A process as claimed in claim 1, in which said enzyme is an oxidoreductase.

9. A process as claimed in claim 8, in which said mixture is treated with an enzyme for a period of about 1 to 120 hours at a temperature of about 10° to 100° C.

10. A process as claimed in claim 8, in which said mixture is treated with said enzyme at a pH between about 3 and 10.

11. A process as claimed in claim 10, in which said pH is about 5.

12. A process as claimed in claim 8, in which said spent vanilla materials are spent pods and beans ground to increase exposure to said enzyme.

13. A process as claimed in claim 1, in which said flavor constituents include flavor precursors.

14. A process as claimed in claim 1, in which said flavor constituents include food modifiers.

* * * * *